United States Patent Office 3,361,587
Patented Jan. 2, 1968

3,361,587
COATING COMPOSITION AND METHOD FOR APPLYING SAME TO POLYOLEFIN FILMS
Virginia C. Menikheim, Chapel Hill, N.C., and Esther M. Rodriguez, La Grange Park, Ill., assignors to Union Carbide Corporation, a corporation of New York
No Drawing. Filed Dec. 30, 1963, Ser. No. 334,584
13 Claims. (Cl. 117—47)

ABSTRACT OF THE DISCLOSURE

The surfaces of polyolefin films are coated with a stable composition which renders the coated polyolefin film substantially impervious to oxygen and moisture vapor and resistant to greases, oils and most chemicals. The coating composition exhibits improved shelf life and contains vinylidene chloride, diethyl maleate and acrylic acid and can include an ether acrylate.

This invention relates generally to polyolefin film coatings and, more particularly, to a coating composition which is resistant to oils and solvents, and has low oxygen and moisture vapor transmission values, which polyolefin film coating composition is stabilized for storage periods of at least 3 to 6 weeks against decay prior to being coated on a film.

Polyolefin film has found wide-spread use as a wrapping and packaging material for many articles of commerce because of its flexibility, transparency, low moisture permeability, resistance to the action of many chemicals, and other properties. However, polyolefin films are also unduly permeable to oxygen and are generally not as resistant to oils, greases and similar substances as is desired by the packaging industry.

It has recently been discovered that polyolefin films can be coated with resins comprising vinylidene chloride-containing copolymers, which coatings render such polyolefin films generally more impervious to most gases and sufficiently resistant to the action of most chemicals and greases for food packaging applications.

It is an object of this invention to provide a polyolefin film which is substantially impervious to oxygen and moisture vapor.

It is another object of this invention to provide a coated polyolefin film which is resistant to greases, oils, and most chemicals.

It is a further object of this invention to provide an oxygen barrier composition which is stable in a form convenient for application as a coating on polyolefin films, which coating adheres strongly to the polyolefin film.

Throughout the remainder of the specification, polyolefin films will be exemplified by polyethylene. It should be understood, however, that the practice of this invention is not limited to pure or unmodified polyethylene, including both low and high density polyethylene, but is also applicable to other olefinic polymers such as polypropylene, polybutene, and polystyrene, to mixtures of these polymers and to copolymers formed from mixtures of ethylene, propylene, or butene monomers or polymers. The term "polyolefin film" is also meant to encompass such polymers to which have been added slip agents, pigments, anti-static agents, anti-blocking agents, anti-fog agents and/or dyes in quantities conventionally added for the intended purpose.

Constituent proportions set forth herein are by weight unless otherwise specified.

In accordance with this invention, there is provided a coating composition for polyolefin film comprising the polymerization product of about 83 to 88 weight percent vinylidene chloride, about 7 to 14 weight percent diethyl maleate, and about 3 to 6 weight percent acrylic acid. A preferred range of monomer proportions is 84 to 86 weight percent vinylidene chloride, 7 to 10 weight percent diethyl maleate, and 4 to 6 weight percent acrylic acid. The optimum coating composition consists of the polymerization product of 85 weight percent vinylidene chloride, 10 weight percent diethyl maleate, and 5 weight percent acrylic acid. There is also provided a polyolefin film coated with the aforedescribed coating composition.

Another embodiment of the subject invention includes the addition of up to about 4 weight percent of an ether acrylate such as for example a 2-methoxyethyl acrylate, to the terpolymer reactant set forth above. It is preferred to use 1 to 4 weight percent methoxyethyl acrylate.

The proportions of vinylidene chloride useful in forming a polymeric coating composition according to this invention are critical in that greater than 88 weight percent vinylidene chloride results in brittle coatings having too low extensibility and less than 83 weight percent vinylidene chloride results in a coated film having oxygen permeability greater than the desired limits.

The concentration of diethyl maleate is critical in that less than 7 weight percent of this material reduces the usable life of latex coating composition to one day or less, and greater than 14 weight percent diethyl maleate results in a coated polyolefin film with high gas transmission rates and low extensibility.

The acrylic acid concentration is critical in that greater than 6 weight percent of this material results in a coating composition which is brittle and less than 3 weight percent acrylic acid results in latex coating compositions which do not wet uniformly on a polyolefin film surface which has been surface treated to give a wetting tension of 41 dynes.

It has been found that the surface of the polyolefin film to be coated should have a wetting tension value such that it is wetted for a few seconds by liquids having a surface tension value of at least 41 dynes per centimeter in order to permit vinylidene chloride copolymer coating applied thereto to adhere well. A method of determining the wetting tension value of a polyolefin surface is set forth hereinafter. This method relies upon the comparison of the surface tension of known liquid mixtures and the effect of the surface in question on them. In particular, previously calibrated mixtures of formamide and 2-ethoxyethanol are preferably used to determine wetting tension.

Since polyolefin films do not generally exhibit wetting tensions sufficiently high to make them amenable to coating with polymers according to this invention, it has been found expedient to modify these films by pretreatment in order to improve their surface characteristics, particularly their wetting tension. This surface modification results in increasing the wetting tension value of the surface to be coated. The pretreatment can be by means of open flame, chlorination under ultraviolet light, oxidation, high voltage stress accompanied by corona discharge, a combination of these means, or other similar means.

High voltage stress accompanied by corona discharge treatment is disclosed in British Patent No. 715,914. It has been found best when using low frequency corona discharge to subject a polyolefin film to successive treatments of this nature rather than attempting to properly modify the film in one-pass. One-pass modification of polyolefin films to a desired surface wetting tension can be efficiently accomplished by using high frequency corona discharge techniques. In this particular invention it has been found that, while a wetting tension of 41 dynes per centimeter is sufficient for good coating adhesion, surfaces treated by corona discharge techniques are preferably modified to exhibit at least 54 dynes per centimeter wetting tension.

One treatment of polyolefin films by means of open flame is disclosed in U.S. Patent No. 2,704,382. When surface modification by the open flame technique is employed, a wetting tension value of at least 41 dynes per centimeter should be realized before attempting to apply an adherent coating to the surface.

Treatment of polyolefin film by chlorination under ultraviolet light is disclosed in U.S. Patent No. 2,502,841. A wetting tension of at least 41 dynes per centimeter must be realized when using this type of treatment.

Coating compositions according to this invention can be applied to polyolefin films either from a latex or solution. It is preferred, however, to apply such coatings from a latex. For latex application, a mixture of monomers of the composition described above is blended with water; acidified; mixed with a polymerization initiator and an activator; and emulsified. Polymerization in a latex should be allowed to proceed to a 95 percent conversion of monomers to polymer. One particular latex coating composition which was found to perform quite well was prepared by reacting 32.6 percent of a mixture of monomers according to this invention; 65.6 percent oxygen-free water; about 1.3 percent of a 30 percent aqueous sodium alcohol sulfate emulsified solution; 0.36 percent of 4 normal sulfuric acid; and 0.07 percent each of ammonium persulfate initiator and sodium metabisulfate activator. In the preparation of this specific latex, agitation was at 18 revolutions per minute for about four hours during which time the temperature was maintained at 35° C. Resins high in vinylidene chloride content become more crystalline in the latex dispersion as the latex ages; consequently the wettability and fusion characteristics of the latices decrease and the oxygen permeability of the films coated from such latices increase with the age of the latex coating composition prior to application. Therefore, it is important that the application of the coatings be made before the dispersed resin becomes too crystalline to readily form a continuous barrier coating.

Where the coating composition is to be applied from a solution, it is preferred to polymerize by emulsion, bulk or suspension polymerization to conversion of less than 90 percent and more than 70 percent with subsequent solution in some solvent which is totally vaporizable and which does not leave a residue upon evaporation. One example of such a solvent is tetrahydrofurane. It is practical to use a 10 percent polymer solution in this solvent for coating purposes.

to a polyolefin film by dipping, spraying, brushing, rolling, doctoring, painting or the like in a conventional manner. Polymeric films coated with compositions according to this invention by any of the above means must be dried to remove solvent or carrier, whichever is present. The drying step can be accomplished by passing the coated films through a heater which may, for example, conveniently be an infra-red source. It has been found particularly expedient to use two sets of heating zones, the first being set at a somewhat lower temperature than the second in order to effect relatively gradual drying. Where the first heater was maintained between 55° C. and 60° C. and the second heater was maintained between 75° C. and 80° C., the coated polyethylene film was preferably fed through the heaters at 23.5 inches per minute. It is, of course, understood that these speeds and temperatures are not limiting factors in the practice of this invention but are exemplary thereof. Modification will be available to those skilled in this art depending upon specific coating composition, thickness of the coating and the particular application method chosen.

It has been found expedient to apply coatings of a thickness of from 0.005 to 0.5 mil. However, it is preferred to use coatings of a thickness between 0.03 and 0.08 mil.

The term "useful latices" is defined as a latex which when used as a coating composition results in a coated film possessing a haze value of less than 10 percent and an oxygen transmission rate of not more than 50 percent greater than that of the film coated with freshly prepared latices.

Table I below shows examples of various coating compositions according to this invention. In each of these examples, polyethylene film, 1.5 mils in thickness, was treated on both surfaces thereof by the action of chlorine under ultraviolet light to a wetting tension value of 43 dynes per centimeter. Both surfaces of the film were coated with the latex composition as indicated to a coating thickness of about 0.05 mil.

TABLE I

| | Examples | | | | | | | | |
|---|---|---|---|---|---|---|---|---|---|
| | 1 | 2 | 3 | 4 | 5 | 6 | 7 | 8 | 9 |
| Ratio of Monomer Units in Coating Resin (parts by weight): | | | | | | | | | |
| Vinylidene | 88 | 87 | 85 | 83 | 83 | 85 | 85 | 85 | 85 |
| Diethyl Maleate | 7 | 8 | 10 | 12 | 14 | 9 | 9 | 9 | 8 |
| Acrylate | | | | | | [1]1 | [2]1 | [3]1 | [3]2 |
| Acrylic Acid | 5 | 5 | 5 | 5 | 5 | 5 | 5 | 5 | 5 |
| Polymerization Conditions—Latex Characteristics 17 hours at 35° C.: | | | | | | | | | |
| Useful Coating Life (days) | 1 | 1 | 7 | 5 | 3 | 5 | 9 | 15 | 19 |
| Viscosity at pH 6 pH 10 (cps.) | 5/5 | 5/6 | 5/5 | 6/6 | 6/7 | 6/6 | 10/12 | 6/7 | 7/8 |
| Properties of Coated Films: | | | | | | | | | |
| Percent Haze | 4.1 | 4.2 | 2.8 | 2.9 | 2.9 | 2.8 | 2.7 | 2.5 | 2.6 |
| Blushing Point (MD/TD) (percent extension) | 60/60 | 70/70 | 60/60 | 50/50 | 50/50 | 70/70 | 70/70 | 100/110 | 110/130 |
| Immediate Blocking: | | | | | | | | | |
| Fresh Latex | 40 | 28 | 50 | 35 | 05 | 200 | 120 | 135 | 190 |
| 3 day old Latex | | | 35 | | | 120 | 45 | 55 | 0 |
| Immediate Slip: | | | | | | | | | |
| Fresh Latex | 95 | 99 | 118 | 91 | 77 | 82 | 91 | 95 | 145 |
| 3 day old Latex | | | 95 | | | 78 | 85 | 95 | 95 |
| Oxygen Transmission (cc./100 sq. in./24 hrs./0.1 mil coating) | 0.7 | 1.9 | 1.4 | 2.4 | 2.5 | 1.9 | 3.5 | 2.7 | 1.6 |

[1] Ethyl. [2] 2-ethyl-hexyl. [3] 2-methoxy-ethyl.

Blocking values shown in Table I are a measure of the force required to separate 16 square inches of film from another identical film while applying a force increasing at the rate of 10 grams per minute to these films. The test by which these data are obtained consists of pressing together two strips of film each 4 inches by 5 inches under a 30 pound load for 3 days at 49° C. After this time the film is manually separated for ½-inch on each short end thus leaving 4-inch squares of film adhered to each other. The separated half-inch on the ends of each film are attached respectively to a fixed and movable plate also 4 inches by 4 inches. The movable plate is one arm of A coating according to this invention can be applied a balance and weights are adhered to the other arm of a balance until the films separate. This weight is the blocking value.

The data in Table I show the shelf life of latices according to this invention together with the properties of films coated with such latices. Columns 1 through 5 show terpolymers and columns 6 through 9 show quad polymers.

The data in Table I, columns 6 and 7, show that an improvement in useful coating life and properties of vinylidene chloride-containing polymers is obtained by including an alkyl acrylate in the coating composition. It can readily be seen from this data that not only is the shelf life of the latex composition of this invention improved, but that polyolefin film coated with a quad polymer containing an alkyl acrylate has a slightly higher extensibility point and lower haze.

The data of Table I, columns 8 and 9, show that by utilizing an ether acrylate in a quad polymer coating composition according to this invention, the useful coating life is greatly and dramatically improved. Additionally, the physical properties of a polyolefin film coated with such a quad polymer rather than a terpolymer are, in some instances, actually better. For example, the extensibility of a polyolefin film coated with a quad polymer according to this invention is excellent. The phrase "wetting tension" as used herein is defined as the minimum surface tension of a liquid mixture of formamide and Cellosolve that will not break up into droplets within a specified period of time, when said liquid is spread upon the polyolefin surface.

Although a specific mixture of liquid chemicals is used herein, it is to be understood that other liquids alone or in mixtures can be used to obtain the wetting tension values described. It being understood that when using other liquid chemicals, the wetting tension numerical values will not necessarily be the same. However, other liquid wetting tension values can be standardized against the formamide-Cellosolve mixture described herein.

The wetting tension values are obtained by the method described below.

A series of mixtures of chemically pure formamide and Cellosolve (2-ethoxyethanol) are prepared having the wetting tension values listed below:

| Formamide (percent by volume) | Cellosolve (percent) | Wetting Tension (dynes/cm.) |
|---|---|---|
| 0 | 100.0 | 30 |
| 2.5 | 97.5 | 31 |
| 10.5 | 89.5 | 32 |
| 19.0 | 81.0 | 33 |
| 26.5 | 73.5 | 34 |
| 35.0 | 65.0 | 35 |
| 42.5 | 57.5 | 36 |
| 48.5 | 51.5 | 37 |
| 54.0 | 46.0 | 38 |
| 59.0 | 41.0 | 39 |
| 63.5 | 36.5 | 40 |
| 67.5 | 32.5 | 41 |
| 71.5 | 28.5 | 42 |
| 74.7 | 25.3 | 43 |
| 78.0 | 22.0 | 44 |
| 80.3 | 19.7 | 45 |
| 83.0 | 17.0 | 46 |
| 87.0 | 13.0 | 48 |
| 90.7 | 9.3 | 50 |
| 93.7 | 6.3 | 52 |
| 96.5 | 3.5 | 54 |
| 99.0 | 1.0 | 56 |
| 100.0 | 0 | 57 |

In practice, each mixture is stored in a small mouth bottle supplied with a suitable cap to prevent evaporation, and contamination. For fractional wetting tension values the mixtures may be prepared by extrapolating between the values listed in the table.

The procedure for testing the treated surface is carried out at a temperature of 20-25° C. and at relative humidity of 50% and is essentially as follows:

(1) A fresh cotton swab is wetted with one of the mixtures using a minimum amount of liquid.

(2) Using the cotton swab, the liquid is spread lightly over an area of approximately one square inch, using only one stroke to spread the liquid.

Oxygen transmission is measured by ASTM method D-1434-58.

What is claimed is:

1. The polymerization product consisting essentially of the monomers of about 83 to 88 weight percent, vinylidene chloride, about 7 to 14 weight percent diethyl maleate, about 3 to 6 weight percent acrylic acid, and 0 to about 4 weight percent 2-methoxyethyl acrylate.

2. The polymerization product consisting essentially of the monomers of 84 to 86 weight percent vinylidene chloride, 7 to 10 weight percent diethyl maleate, 4 to 6 weight percent acrylic acid, and 1 to 4 weight percent 2-methoxyethyl acrylate.

3. The polymerization product of 85 weight percent vinylidene chloride, 8 weight percent diethyl maleate, 5 weight percent acrylic acid, and 2 weight percent 2-methoxyethyl acrylate.

4. A polyolefin film coated on at least one side thereof with the polymerization product consisting essentially of the monomers of about 83 to 88 weight percent vinylidene chloride, about 7 to 14 weight percent diethyl maleate, about 3 to 6 weight percent acrylic acid and 0 to about 4 weight percent 2-methoxyethyl acrylate.

5. The coated film of claim 4 wherein the film is polyethylene.

6. The coated film of claim 5 wherein at least one surface thereof has a wetting tension of at least 41 dynes per centimeter.

7. The coated film of claim 5 wherein at least one surface thereof is treated by high voltage stress accompanied by corona discharge to a wetting tension level of at least 54 dynes per centimeter.

8. The process of rendering a polyolefin film substantially impervious to oxygen which process comprises treating at least one surface of said polyolefin film until a wetting tension of at least 41 dynes per centimeter is attained; copolymerizing about 83 to 88 weight percent vinylidene chloride, about 7 to 14 weight percent diethyl maleate, about 3 to 6 weight percent acrylic acid, and 0 to about 4 weight percent 2-methoxy ethyl acrylate; applying said copolymer to said treated polyolefin film surface; and drying said coated film.

9. The process of claim 8 wherein said copolymer is applied to said treated surface from a latex vehicle.

10. The process of claim 8 wherein said copolymer is applied to said treated surface from a solvent vehicle.

11. The process of claim 8 wherein said polyolefin surface is treated by exposure to high voltage stress accompanied by corona discharge.

12. The process of claim 8 wherein said polyolefin surface is treated by exposure to chlorine in the presence of ultraviolet light.

13. The process of claim 8 wherein said polyolefin surface is treated by exposure to an open flame.

References Cited

UNITED STATES PATENTS

| | | | |
|---|---|---|---|
| 2,460,573 | 2/1949 | Folt | 260—78.5 |
| 2,473,549 | 6/1949 | Smith | 260—78.5 |
| 2,502,841 | 4/1950 | Henderson | 117—12 |
| 2,810,933 | 10/1957 | Pierce et al. | 117—138.8 |
| 3,058,939 | 10/1962 | Meier | 260—29.6 |
| 3,236,818 | 2/1966 | Covington | 260—78.5 |
| 3,255,034 | 6/1966 | Covington et al. | 117—138.8 |

WILLIAM D. MARTIN, *Primary Examiner.*

R. HUSACK, *Assistant Examiner.*